United States Patent [19]

Fabro et al.

[11] 3,913,865

[45] Oct. 21, 1975

[54] APPARATUS FOR TRANSPORTING FLEXIBLE WEBS IN MOTION PICTURE PROJECTORS OR THE LIKE

[75] Inventors: Roberto Fabro, Turin; Roberto Tolone, Rivoli Torinese, both of Italy

[73] Assignee: Robert Bosch Photokino GmbH, Stuttgart, Germany

[22] Filed: May 7, 1974

[21] Appl. No.: 467,649

[52] U.S. Cl. .............................. 242/189; 242/75.51

[51] Int. Cl.² .................. B65H 59/38; B65H 63/02; G03B 1/04; G11B 15/32

[58] Field of Search .................. 242/189, 190, 75.51

[56] References Cited

UNITED STATES PATENTS

| | | | |
|---|---|---|---|
| 3,443,812 | 5/1969 | Atsumi | 242/190 |
| 3,789,238 | 1/1974 | Presentey | 242/189 |

*Primary Examiner*—Leonard D. Christian

*Attorney, Agent, or Firm*—Michael S. Striker

[57] ABSTRACT

A motion picture projector or tape recorder wherein the tension of film or tape is monitored by a damping member which opens a tension-responsive switch in the circuit of the motor when the tension increases, for example, when the supply of film or tape on the supply reel is exhausted but the trailing portion of the film or tape remains attached to the core of the supply reel. In order to prevent the damping member from arresting the motor when the tension of the film or tape increases in response to a change in the direction of transport from rearward (when the supply reel rotates in a direction to collect the film or tape) to forward (when the supply reel rotates in a direction to pay out the film or tape), a motor-driven control device prevents the switch from opening the motor circuit for a certain interval following the start of operation to transport the film or tape forwardly and while the supply reel continues to rotate in a direction to collect the flexible material, or the control device closes a second switch which is connected in parallel with the tension-responsive switch. The control device further maintains the tension-responsive switch or the second switch in closed position while the supply reel collects the film or tape.

21 Claims, 7 Drawing Figures

APPARATUS FOR TRANSPORTING FLEXIBLE WEBS IN MOTION PICTURE PROJECTORS OR THE LIKE

BACKGROUND OF THE INVENTION

The present invention relates to apparatus wherein a flexible web or strip is transported forwardly and rearwardly, especially to motion picture projectors, tape recorders or analogous apparatus wherein a length of film, magnetic tape or another flexible strip- or web-shaped carrier of information is transported lengthwise, normally from a supply reel to a takeup reel or vice versa.

It is already known to equip a motion picture projector or a tape recorder with a switch (normally a microswitch) which is responsive to increasing tension of the film or tape and serves to arrest the motor of the drive means for the film or tape when the tension reaches a predetermined value. For the sake of simplicity, conventional apparatus of the type to which the present invention pertains will be described primarily with reference to a motion picture projector with the understanding, however, that the invention can be embodied with equal advantage in tape recorders and/or any other apparatus wherein a flexible web or strip is transported forwardly or backwards.

In a motion picture projector, the film is transported forwardly by a drive which rotates the takeup reel in a direction to collect the film while the supply reel rotates in a direction to pay out the film. A claw pull-down or intermittent is used to advance the film stepwise in a region between the supply and takeup reels so as to place successive film frames into register with the gate and hence with the optical and illuminating systems of the projector. The tension of film between the supply reel and the pull-down increases whenever the pull-down performs a forward stroke. Therefore, the position of the so-called damping member which monitors the tension of film upstream of the pull-down changes in rhythm with movements of the pull-down and, if the damping member is is permanent contact with the tension-responsive switch, one or more movable parts of the switch are displaced in response to each movement of the damping member. As a rule, a spring in the switch snaps over and opens the circuit of the motor in the film drive of the projector when the tension of film increases to such an extent that the damping members shifts the movable portion or portions of the switch beyond a predetermined position. Such mode of actuating the switch is unsatisfactory because the useful life of the switch is short due to continuous shifting of the movable portion or portions and cntinuous flexing of the spring. Moreover, if the switch is responsive to tension of motion picture film which carries a sound track or to the tension of magnetic tape, constant shifting of the movable portion or portions produces undesirable noise which is amplified by the sound reproducing system of the projector or tape recorder.

Another drawback of presently known tension-responsive switches is that they react not only when a stoppage of the motor is advantageous (for example, when the supply of film on the supply reel is exhausted and the direction of film transport is to be reversed so that the film begins to travel from the takeup reel and is collected by the core of the supply reel) but also when a stoppage of the motor is undesirable, for example, when the operator decides to transport a certain length of the film backwards for renewed viewing of selected film frames or when the film is to be rapidly collected by the supply reel prior to renewed viewing or replacement with another film. In most instances, the rewinding of film onto the supply reel takes place while the film is transported at a high speed. Therefore, the tension of film is greater than during forward transport for the purpose of viewing, and the tension-responsive switch is likely to arrest the motor during rewinding. Analogously, a magnetic tape is normally rewound at a high speed upon completion of sound recording or upon completion of sound reproduction. Opening of the motor circuit during such rapid transport of the film or tape is undesirable and should be avoided. The situation is analogous when the operator of a motion picture projector decides to actuate the controls so as to abruptly change the direction of film transport from forward to reverse, e.g., in order to rapidly move a certain number of film frames back toward the supply reel for renewed observation of their images, or to abruptly shift to operation in forward direction while the film is being rapidly rewound on the supply reel. In the latter instance, the supply reel continues to rotate in a direction to collect the film due to inertia of its parts and of the supply of film thereon so that the tension of film between the pull-down (which is already operated to transport the film forwardly) and the supply reel (which continues to rotate in a direction to collect the film) increases instantaneously and reaches a value which is amply sufficient to actuate the tension-responsive switch. The tension decreases so as to permit the switch to open when the supply reel begins to rotate in a direction to pay out the film. In response to an abrupt change from forward to rearward transport, inertia of the takeup reel is likely to cause excessive tensioning of motion picture film so that the switch is again likely to react and to arrest the motor which drives the pull-down and the supply or takeup reel.

SUMMARY OF THE INVENTION

An object of the invention is to provide an apparatus of the above outlined character, particularly a motion picture projector or a tape recorder, with novel and improved means for preventing the tension-responsive switch from arresting the drive for the web when such stoppage is not desired.

Another object of the invention is to provide a motion picture projector or tape recorder wherein the tension-responsive switch is free to operate in the customary way (i.e., to arrest the motor and/or to reverse the direction of transport of film or tape) while the apparatus operates normally to project the images of film frames onto a screeen, to record sound on a magnetic tape or to reporduce sound which is stored on magnetic tape, but cannot interfere with rapid rewindng of film or tape even if such rapid rewindng is accompanied by tensioning which suffices to actuate the switch.

A further object of the invention is to provide a motion picture projector or tape recorder which is provided with novel and improved means for preventing the switch from arresting the drive for the film or tape in response to such short-lasting tensioning of flexible material which invariablly occurs in response to an abrupt change in the direction of transport, either from forward to reverse or vice versa.

The invention is embodied in an apparatus, particularly in a motion picture projector or a tape recorder, wherein a flexible web (e.g., a length of motion picture film or a length of magnetic tape) is transported forwardly and rearwardly. The apparatus comprises a rotary web supporting device (e.g., the supply reel of a motion picture projector or the supply reel in a cassette for motion picture film or magnetic tape), drive means (including an electric motor and switch means in circuit with the motor) which is operable to transport the web forwardly whereby the supporting device rotates in a first direction to pay out the web and rearwardly whereby the supporting device rotates in a second direction to collect the web and the tension of the web increases when the supply of web on the supporting device is suabstantially exhausted and temporarily due to inertia of the supporting device while the direction of rotation of the supporting device is changed from the second direction to the first direction, means for monitoring the changes in tension of the web and for normally arresting the motor of the drive means by way of the switch means when the tension of the web increases (such monitoring means may comprise a conventional elastic damping member which is displaced by the web when the tension of the web increases and a switch actuating member which is directly or indirectly conected with and movable by the damping member), and control means for preventing a stoppage of the motor by way of the switch means while the web is transported rearwardly and during the aforementioned temporary increase in tension of the web. Thus, the monitoring means is free to arrest the motor while the web is transported forwardly (the monitoring means will arrest the motor when the supply of web on the supporting device is practically exhausted or when the tension of the web during forward transport increases for another reason, e.g., due to malfunctioning of te pull-down in a motion picture projector); however, the monitoring means cannot arrest the motor during rearward transport and/or during the interval immediately following a change in the direction of operation of the drive means (particularly from rearward to forward transport of the web) so that a temporary tensioning of web which is due to inertia of the supporting device for the web cannot result in stoppage of the motor.

The control means comprises a preferably rotatable control member which can maintain the switch means in closed position (either by directly closing a normally open switch or by preventing the monitoring means from opening a normally closed switch) during rearward transport of the web as well as during the first stage of subsequent forward transport of the web; such first stage of forward transport of the web takes place during a temporary increase in tension of the web owing to inertia of the supporting device which tends to continue to rotate in a direction to collect the web when the direction of web transport is abruptly changed from reverse to forward.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figures 1, 2, 3:
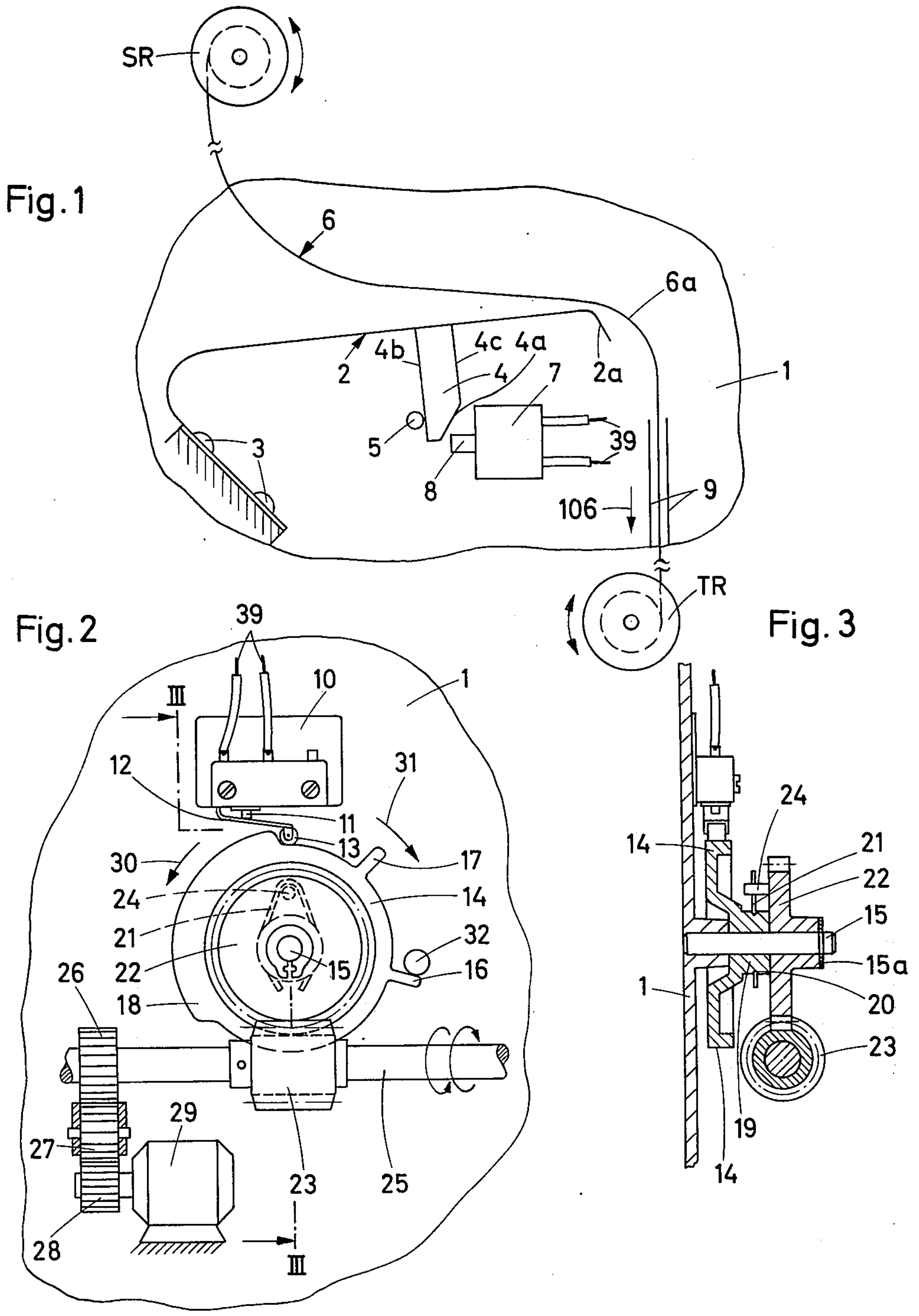
FIG. 1 is a fragmentary schematic view of a motion picture projector which embodies one form of the invention, there being shown a tension-responsive switch and a monitoring means which can open the switch when the tension of the film increases.
FIG. 2 is an elevational view of the improved control means in the projector of FIGI. 1, there being shown a second switch which is automatically closed during certain stages of transport of motion picture film to thereby prevent the switch of FIG. 1 from arresting the drive means for the film.
FIG. 3 is a sectional view substantially as seen in the direction of arrows from the line III—III of FIG. 2.

Referring first to FIGS. 1 to 3, there is shown a portion of a motion picture projector having a housing 1 which mounts two rotary film supporting devices including a supply reel SR and a takeup reel TR each connected with one end of an elongated web of motion picture film 6. The housing 1 further supports a tension monitoring means including an elastic damping member 2 which is secured to the housing by rivets 3 or analogous fasteners and has an arcuate end portion 2*a* which is adjacent to the path of the film 6 between the supporting devices or reels SR and TR. The end portion 2*a* of the damping member is located upstream of a conventional film guide 9 mounted in the housing 1 in the region of the gate, not shown. An intermediate portion of the damping member 2 carries an actuating member or trip 4 which constitutes a second component of the monitoring means and can depress the movable portion 8 of a normally closed tension-responsive switch 7, preferably a microswitch. When the tension of film 6 increases, for example, when the film is collected by the takeup reel TR so that its trailing portion extends radially from the core of the supply reel SR, the size of the loop 6*a* in the region of the end portion 2*a* decreases whereby the trip 4 of the monitoring means moves downwardly, as viewed in FIG. 1, and its inclined surface 4*a* depresses the movable portion 8 to open the switch 7. The rear surface 4*b* of the trip 4 abuts against and is slidable along a fixed stop 5 in the housing 1. The switch 7 opens not later than when the movable portion 8 is engaged by the surface 4*c* of the trip 4. The surface 4*c* insures that the switch 7 remains open even if the tension of film 6 fluctuates, as long as the surface 4*c* engages the movable portion 8.

The housing 1 further supports a normally open second switch 10 which is connected in parallel with the normally closed tension-responsive switch 7 and has a movable portion 11. The casing of the switch 10 carries an elastic tongue 12 for a roller follower 13 which bears against the periphery of an oscillatable control cam 14 under the bias of the tongue 12. The tongue 12 can depress the movable portion 11 to thereby close the second switch 10 when the follower 13 is engaged and displaced by an arcuate lobe 18 of the control cam 14. The latter is rotatable on a shaft 15 which is affixed to the housing 1. Two radially outwardly extending projections or arms 16, 17 of the control cam 14 are disposed at the opposite sides of a pin-shaped arresting member 32 which is secured to the housing 1. The cam 14 has a hub 19 which is formed with a circumferential groove 20 for a simmple friction cluch here shown as a hairpin spring 21 having two legs which extend into the groove 20 and bear against the hub 19. The median portion of the spring 21 is looped around an entraining post 24 which is provided on a worm wheel 22 rotatable on the shaft 15 and disposed between the hub 19 and a split ring 15*a* at the free end of the shaft 15. The worm wheel 22 meshes with a worm 23 which is mounted on a worm shaft 25 driven by an electric motor 29 through the medium of a reversible gearing including the elements 26, 27 and 28. The entraining post 24 of the worm wheel 22 is parallel to the axis of the shaft 15 The parts 21, 24, 22, 23, 25–28 constitute a power train forming part of the drive means for the film 6 and serving to rotate the control cam 14 clockwise or counterclockwise. When the motor 29 rotates the shaft of the takeup reel TR in a direction to collect the film 6, the worm 22 rotates in the direction indicated by an arrow 30. The direction of rotation of the worm wheel 22 can be reversed without changing the direction of rotation of the motor 29 when the projector is set to transport the film 6 from the take-up reel TR toward the supply reel SR. The worm 23 then rotates the worm wheel 22 in the direction indicated by an arrow 31.

The arresting member 32 cooperates with the projections 16, 17 to limit the extent of clockwise or counterclockwise rotation of the control cam 14 with the worm wheel 22.

Figure 4:
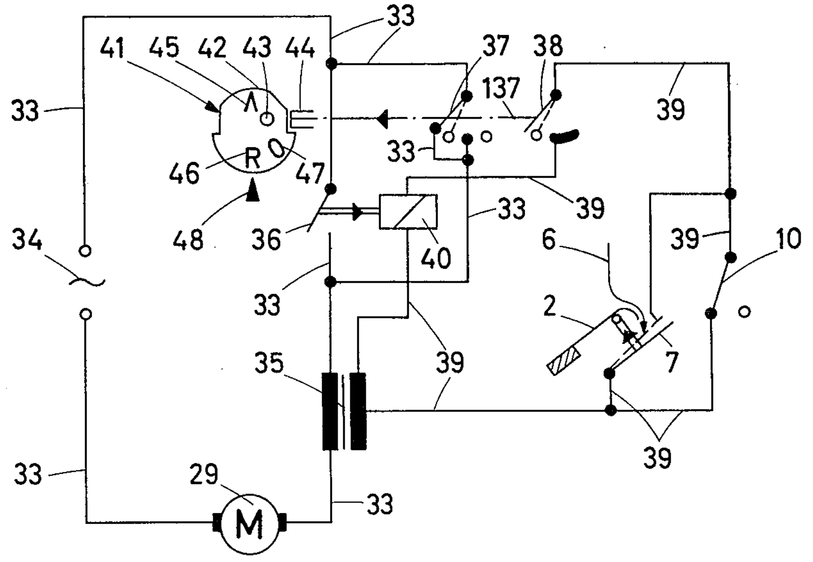
FIG. 4 is a diagram of the electric circuit of the projector which embodies the structure of FIGS 1–3, the drive means being set to transport the film rearwardly.
Figure 5:
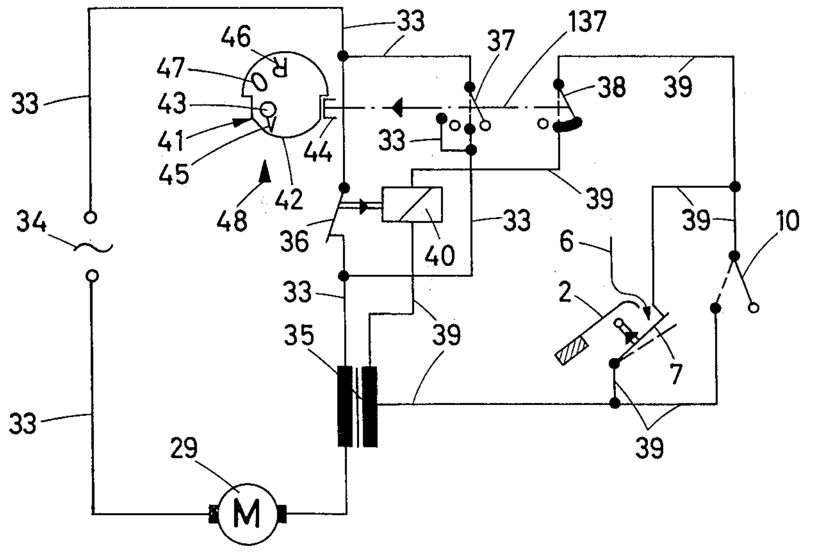
FIG. 5 is a similar diagram but with the drive means set to transport the film forwardly.

The electric motor 29 is connected in the primary portion of an electric circuit which is shown in FIGS. 4 and 5. The primary portion of the circuit includes condutors 33, a source 34 of d-c current in series with the motor 29, a normally closed electromagnetically actuated switch 36 in series with the source 34, and the primary winding of a transformer 35. The switch 36 is connected in parallel with a master switch 37 which is mechanically coupled to an auxiliary switch 38 in the secondary portion of the electric circuit. The secondary portion of the circuit further includes conductors 39, a normally energized holding electromagnet 40 for the switch 36, the secondary winding of the tranformer 35, the noramlly open second switch 10 and the normally closed tension-responsive switch 7 which is connected in parallel with the switch 10. The mechanical connection 137 between the switches 37, 38 is such that, when the movable contact of the master switch 37 assumes the solid-line position of FIG. 4 (the film 6 is then transported rearwardly and the motor 29 drives the supply reel SR of FIG. 1 in a direction to collect the film), the auxiliary switch 38 is open (see the solid-line position of the movable contact of the switch 38 in FIG. 4). When the movable contact of the master switch 37 assumes the broken-line position of FIG. 4, the mechanical connection 137 maintains the movable contact of the auxiliary switch 38 in the broken-line position so that the switches 37 and 38 are open. In FIG. 5, the broken lines indicate those intermediate positions of the movable contacts of switches 37, 38 in which the motor 29 rotates its output shaft in the same direction as during rearward transport of the film 6 but the film is transported forwardly, i.e., the takeup reel TR is driven to collect the film and the supply reel SR is rotated by the film. When the movable contact of the master switch 37 is held in the solid position of FIG. 5, the mechanical connection 137 maintains the movable contact of the auxiliary switch 38 in the solid-line position, i.e., the switch 37 is open but the switch 38 is closed.

The means for moving the movable contact of the master switch 37 between the aforedescribed four different positions includes a selector 41 having a cam 42 rotatable about the axis of an eccentric shaft 43 which is mounted in the housing 1, and a follower or pusher 44 which tracks the periphery of the cam 42 and is coupled to the movable contact of the master switch 37. The cam 42 carries three markers 45, 46,, 47 which can be moved into register with a fixed pointer or index 48 at the outer side of the housing 1. The cam 42 is accessible at the outer side of the housing 1 so that it can be manipulated by the user of the projector in order to set the projector for operation in a forward direction (arrow 30 in FIG. 2) by placing the marker 45 into register with the pointer 48, to set the projector for operation in reverse (arrow 31 in FIG. 2) by placing the marker 46 into register with the pointer 48, or to arrest the motor 29 by moving the marker 47 into register with the pointer 40. The shaft 43 for the selector cam 42 can also serve as a means for actuating the reversible gearing 26–28 so that the worm wheel 22 is rotated counterclockwise, as viewed in FIG. 2, when the pointer 48 is in register with the marker 45 and that the worm wheel 22 is rotated clockwise, as viewed in FIG. 2, when the pointer 48 registers with the marker 46. Such types of reversible gearings are well known from the art of cinematographic apparatus. Reference may be had to U.S. Pat. Nos. 1,920,968, 1,926,862, 2,290,276 and 3,074,662. The operation:

The selector cam 42 is assumed to be in the position shown in FIG. 5 so that the master switch 37 is open but the mechanical connection 137 maintains the auxiliary switch 38 is closed position. The tension-responsive switch 7 is closed and the second switch 10 is open. The motor 29 rotates the takeup reel TR in a direction to collect the film 6 so that the worm wheel 22 rotates counterclockwise (arrow 30). The motor 29 also drives the claw pull-down or intermittent (not shown) which places successive film frames into register with the gate so that the images of such frames are projected into a screen or the like. IF the tension of film 6 increases, for example, because the major part of the film has been collected by the core of the takeup reel TR, the size of the loop 6*a* decreases and the damping member 2 is pivoted clockwise, as viewed in FIG. 1 so that its trip 4 depresses the movable portion 8 and opens the tension-responsive switch 7. Since the switch 10 is normally open, the secondary portion of the circuit shown in FIGS. 4 and 5 opens in response to opening of the switch 7 so that the electromagnet 40 becomes deenergized and opens the switch 36 or allows the switch 36 to open. The switch 36 thereby opens the primary portion of the circuit and arrests the motor 29.

If the operator of the projector thereupon desires to rewind the film 6 onto the core of the supply reel SR, the selector cam 42 is rotated to move the marker 46 into register with the pointer 48 whereby the pusher 44 closes the master switch 37 (see FIG. 4) which is connected in parallel with the switch 36. Thus, the motor 29 is started and drives the supply reel SR in a direction to collect the film. At the same time, the worm wheel 22 begins to rotate in a clockwise direction (arrow 31 in FIG. 2) because the turning of the shaft 43 resulted in a resetting of the gearing 26–28 between the output shaft of the motor 29 and the worm shaft 25. The entraining pin 24 of the worm wheel 22 causes the friction clutch 21 to rotate the control cam 14 clockwise, as viewed in FIG. 2, so that the lobe 18 immediately engages and displaces the roller follower 13 to thus cause the tongue 12 to close the second switch 10. Such clockwise angular displacement of the control cam 14 is terminated when the projection 17 engages the arresting member 32. The worm wheel 22 continues to rotate but the friction clutch 21 of the power train between the motor 29 and the control cam 14 merely slides in the groove 20 of the hub 19. When the rewinding of film 6 onto the core of the supply reel SR is completed, the operator turns the selector cam 42 to move the marker 47 into register with the pointer 48 and to thereby open the master switch 37. The motor 29 is arrested because the switch 37 opens while the switch 36 is also open. The mechanical connection 137 maintains the auxiliary switch 38 in open position (see the broken-line positions of the movable contacts of the switches 37 and 38 in FIG. 4). The secondary portion of the circuit opens in response to opening of the auxiliary switch 38 in spite of the fact that the lobe 18 of the control cam 14 maintains the second switch 10 in closed position. It will be noted that the second switch 10 is open only when the control cam 14 assumes the position of FIG. 2, i.e., when the arresting member 32 is engaged by the projection 16.

If the operator of the projector desires to interrupt the rewinding of film 6 onto the supply reel SR, for example, if a selected protion of the film 6 is to be viewed for a second time, the selector cam 42 is turned from the position of FIG. 4 to the position of FIG. 5 so that the motor 29 begins to rotate the takeup reel TR in a direction to collect the film and the worm wheel 22 beings to rotate in the direction indicated by arrow 30. The inertia of the supply reel SR is sufficient to cause this reel to continue to rotate in a direction to collect the film 6 while the pull-down already operates to transport the film 6 forwardly (arrow 106 in FIG. 1). This results in a tensioning of the film 6 between the guide 9 and the supply reel SR so that the size of the loop **6*a* shown in FIG. 1 decreases and the trip 4 of the damping member 2 opens the normally closed switch 7. This switch is normally closed during rearward transport of the film 6 toward the supply reel SR. However, the opening of switch 7 has no immediate effect because the second switch 10 remains closed during a predetermined interval corresponding to the initial stage of renewed rotation of the cam 22 in a counterclockwise direction (arrow 30 in FIG. 2). This is due to the fact that the lobe 18 of the control cam 14 is sufficiently long (as considered in the circumferential direction of the e worm wheel 22) to maintain the second switch 10 is closed position until immediately or shortly before the control cam 14 returns its projection 16 into engagement with the fixed arresting member 32. Therefore, the holding electromagnet 40 remains energized and maintains the switch 36 in closed position to complete the circuit of the motor 29 in spite of the fact that the switch 7 is temporarily open. The distance between the projections 16, 17 of the control cam 14 can be readily selected in such a way that the inertia of supply reel SR is overcome and the film 6 begins to rotate the reel SR in a direction to pay out the film before the projection 16 reaches the arresting member 32. As the supply reel SR begins to rotate in a direction to pay out the film 6, the size of the loop 6*a* increases and the damping member 2 is free to move the trip 4 back to the position of FIG. 1 in which the switch 7 is closed so that the closing of switch 7 precedes or takes place simultaneously with the opening of switch 10. Thus, the electromagnet 40 remains energized and maintains the switch 36 in closed position to thereby insure that the circuit of the motor 29** remains completed.

If the operator wishes to start the projector so as to transport the film 6 forwardly (arrow 30 in FIG. 1) the selector cam 42 is rotated to move the marker 47 out of register with the pointer 48 and to assume the position shown in FIG. 5. This causes the movable contacts of the switches 37, 38 to pivot counterclockwise from the broken-line positions of FIG. 4 to the solid-line positions of FIG. 5. During such pivoting, the movable contact of the master switch 37 temporarily assumes the broken-line intermediate position of FIG. 5, i.e., the master switch 37 is closed simultaneously with closing of the auxiliary switch 38. The primary winding of the transformer 35 is energized and induces a current in the secondary winding. Such induced current is strong enough to energize the electromagnet 40 which closes the switch 36 so that the circuit of the motor 29 remains completed in spite of the fact that the master switch 37 opens practically immediately after its movable contact reaches the broken-line intermediate position of FIG. 5 (on its way toward the solid-line position of FIG. 5). The electromagnet 40 remains energized because the switch 36 is closed and, therefore, the circuit of the motor 29 remains completed even though the master switch 37 is open. The switch 7 is closed but the switch 10 is open. Thus, the secondary portion of the circuit can be opened as soon as the tension of film 6 increases sufficiently to reduce the size of the loop **6*a* to the extent which is necessary to open the switch 7. The latter opens when the film 6 is nearly fully collected by the takeup reel TR as well as in response to malfunctioning of the claw pull-down or for any other reason which suffices to cause the damping member 2 to effect an opening of the switch 7.**

Figure 6:
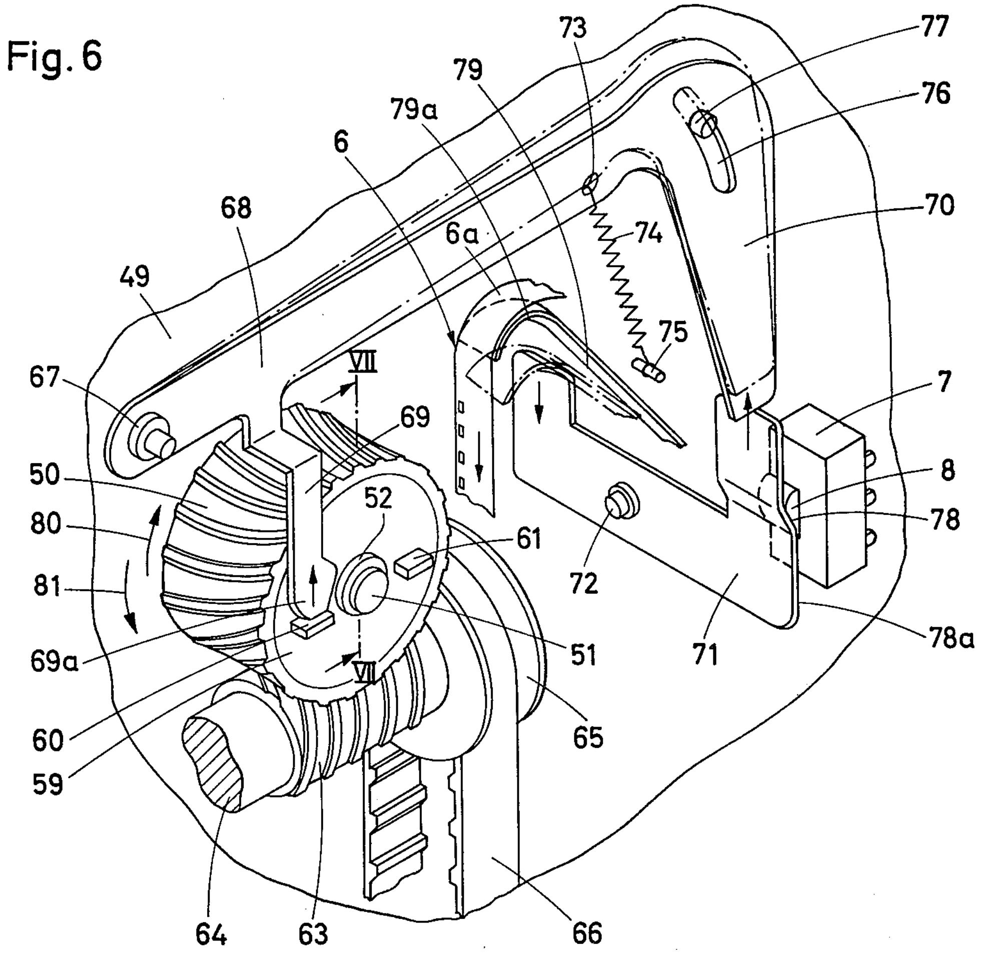
FIG. 6 is a fragmentary perspective view of a modified motion picture projector wherein the switch of FIG. 2 is omitted.
Figure 7:
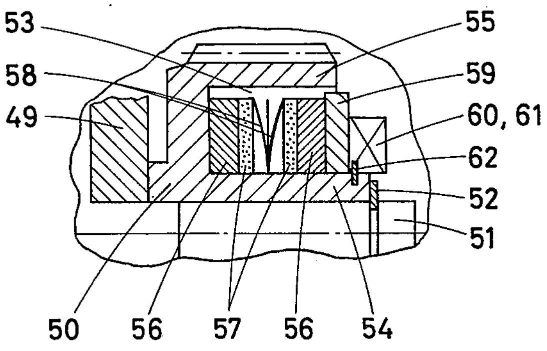
FIG. 7 is a sectional view as seen in the direction of arrows from the line VII—VII of FIG. 6.

The motion picture projector of FIGS. 6 and 7 comprises a housing 49 fixedly supporting a shaft 51 for a worm wheel 50. A split ring 52 is received in a circumferential groove at the free end of the shaft 51 to hold the worm wheel 50 against axial movement. The worm wheel 50 resembles a cup and defines an annular chamber 53 surrounding a cylindrical hub 54 and surrounded by a toothed annulus 55. The chamber 53 receives a friction clutch including ring-shaped friction disks 56 flanking a package of dished springs 58 so that the disks bear against the wall at the closed end of the chamber 53 and against a washer-like control member 59. The latter is rotatable on the hub 54 but is held against axial movement away from the springs 58 by a split retaining ring 62. Additional disks 57 are interposed between the disks 56 and springs 58. The outer side of the control member 59 has two radially extending projections 60, 61 which are located diametrically opposite each other. The control member 59 is located at the open end of the chamber 53 and its projections 60, 61 extend beyond the annulus 55 which meshes with a worm 63 on a worm shaft 64. The latter carries a toothed pulley 65 which is driven by the motor (not shown but corresponding to the motor 29 of FIGS. 2, 4 and 5) through the medium of an endless toothed belt 66. The operative connection between the motor and the belt 66 comprises a reversible gearing (not shown) which is a functional equivalent of the gearing 26–28 and can rotate the worm shaft 64 clockwise or counterclockwise, depending upon whether the selector (not shown) is set to cause the film 6 to advance forwardly or rearwardly. The friction clutch in the chamber 53 and the parts 50, 63, 64, 65, 66 form part of a power train which can rotate the control member 59 clockwise or counterclockwise.

The housing 49 further carries a fixedly mounted pivot member 67 for a one-armed arresting lever 68 which is shown as being mounted at a level above the worm wheel 50 and has a substantially L-shaped extension or bracket 69 with a rounded end portion 69a shown in abutment with the projection 60 of the control member 59. The free end of the arresting lever 68 is formed with a downwardly extending pallet 70 which abuts against one arm of a two-armed actuating lever 71 which is mounted in the housing 49 on a fixed pivot member 72 and is a functional equivalent of the trip 4 shown in FIG. 1. The arresting lever 68 has a hole 73 for one end portion of a helical spring 74 the other end portion of which is attached to a fixed post 75 in the housing 49 so that the arresting lever 68 tends to pivot clockwise, as viewed in FIG. 6. The extent to which the arresting lever 68 can be pivoted under the action or against the opposition of the spring 74 is determined by an arcuate slot 76 which is provided in the pallet 70 and receives a fixedly mounted guide pin 77.

The surfaces **78, 78*a* on the right-hand arm of the actuating lever 71, as viewed in FIG. 6, respectively correspond to surfaces 4*a*, 4*c* of the trip 4. When the actuating lever 71 pivots counterclockwise, the inclined surface 78 gradually depresses the movable portion 8 of the normally closed tension-responsive switch 7 and the latter opens not later than when the movable portion 8 is engaged by the surface 78*a*. The other arm of the actuating lever 71 is adjacent to the arcuate end portion 79*a* of a pivotable damping member 79 which corresponds to the damping member 2 and moves from the solid-line to the phantom-line position of FIG. 6 when the size of the loop 6*a* of motion picture film 6** decreases.

The arrow 80 indicates the direction of rotation of the worm wheel 50 when the film 6 is transported forwardly, and the worm wheel 50 is driven counterclockwise (arrow 81) when the film 6 is transported rearwardly to be collected by the supply reel or an analogous rotary film supporting device, not shown. The actuating lever 71 cooperates with the damping member 79 to form therewith a means for monitoring the tension of film 6 between the supply reel and the claw pulldown.

The operation of the projector which embodies the structure of FIGS. 6 and 7 is as follows:

The tension-responsive switch 7 is assumed to be closed and the motor which drives the toothed belt 66 for the pulley 65 is assumed to be at a standstill. If the selector (not shown) is thereupon actuated to start the motor and to cause the worm wheel 50 to rotate clockwise (arrow 80), the film 6 is transported forwardly. The friction clutch 56–58 in the chamber 53 of the worm wheel 50 turns the control member 59 clockwise so that the projection 60 bears against the rounded end portion **69*a* of the extension 69 and causes the arresting lever 68 to pivot counterclockwise to the extend determined by the guide pin 77. The corresponding inoperative position of the arresting lever 68 is indicated in FIG. 6 by phantom lines. This frees the actuating lever 71 for counterclockwise pivotal movement so that the inclined surface 78 is in a position to open the tension-responsive switch 7. The latter opens as soon as the size of the loop 6*a* decreases because the damping member 79 then pivots the actuating lever 71 counterclockwise, for example, when the major part of film 6** is collected by the core of the takeup reel, not shown.

If the selector is thereupon moved to a position for rearward transport of the film 6, the worm wheel 50 is rotated counterclockwise (arrow 81 in FIG. 6). The projection 60 moves away from the extension 69 so that the spring 74 is free to contract and the pallet 70 of the arresting lever 68 reassumes the solid-line operative postion of FIG. 6 to thereby effect a closing of the switch 7. The damping member 79 would not oppose a movement of actuating lever 71 back to the position of FIG. 6 because the size of the loop **6*a* increases shortly or immediately after the film 6** begins to advance toward the supply reel.

The circuit of the projector which includes the structure of FIGS. 6 and 7 is substantially identical with the circuit of FIGS. 4 and 5 except that the secondary portion of this circuit need not include the normally open second switch 10. This secondary portion of the circuit is completed as soon as the tension-responsive switch 7 closes. The worm wheel 50 (which rotates counterclockwise while the film 6 is being transported toward the supply reel) rotates the control member 59 in the same direction (through the medium of the friction clutch 56–58 in the chamber 53) but the control member 59 is arrested as soon as the projection 61 strikes against the extension 69. The angular position of the control member 59 then remains unchanged until the operator against resets the selector for forward transport of the film 6.

When the selector is thereupon set for forward transport of the film 6, the arresting lever 68 remains in the solid-line operative position of FIG. 6 during a first stage of clockwise rotation of the worm wheel 50 because it takes a certain amount of time to move the projection 60 back into engagement with the end portion **69*a* of the extension 69. Thus, the pallet 70 effectively opposes a counterclockwise pivoting of the actuating lever 71 (and an opening of the tension-responsive switch 7) during that interval of time which is required to return the projection 60 into engagement with the extension 69. This interval is long enough to enable the film 6 to overcome the inertia of the supply reel and to form a loop 6*a* which is large enough to allow the damping member 79 to reassume the solid-line position of FIG. 6 before the projection 60 pivots the arresting lever 68 to the phantom-line inoperative position. Consequently, the switch 7 remains closed whenever the selector is moved from a position for rearward transport to a position for forward transport of the film 6** in spite of the fact that the resetting of the selector results in such reduction of the size of the loop 6*a* which is sufficient to normally cause the damping member 79 to open the switch 7 through the medium of the actuating lever 71. When the arresting lever 68 assumes the phantom-line inoperative position of FIG. 6, the actuating lever 71 is free to open the switch 7 as soon as the size of the loop 6*a* decreases to a predetermined extent which is necessary to pivot the actuating lever 71 so that the movable portion 8 of the switch 7 is engaged by the lowermost portion of the inclined surface 78 or by the surface 78*a*. It will be seen that the structure of FIGS. 6 and 7 can also prevent a stoppage of the motor when the direction of movement of the film 6 is changed from rearward to forward even though the circuit of the motor need not include the switch 10 of FIGS. 2–5.

It is also possible to modify the structure of FIGS. 6–7 in such a way that the spring 74 (or analogous biasing means) urges the arresting lever 68 to the inoperative position. However, the mounting of the spring 74 in a manner as shown in FIG. 6 is preferred at this time because the arresting lever 68 automatically assumes its operative position as soon as the projection 60 moves away from the extension 69.

Without further analysis, the forgoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In an apparatus wherein a flexible web is transported forwardly and rearwardly, particularly in a motion picture projector or tape recorder, a combination comprising a rotary web supporting device; drive means operable to transport the web forwardly whereby said device rotates in a first direction to pay out the web and rearwardly whereby said device rotates in a second direction to collect the web, the tension of said web increasing when the supply of web on said device is substantially exhausted and temporarily due to inertia of said device while the direction of rotation thereof is changed from said second to said first direction, said drive means including an electric motor and switch means in circuit with said motor; means for monitoring said changes in tension and for normally arresting said motor by way of said switch means when said tension increases; and control means for preventing stoppage of said motor by way of said switch means while the web is transported rearwardly and during said temporary increase in tension of the web, said control means comprising means for maintaining said switch means is closed position while the web is transported rearwardly and during the first stage of subsequent forward transport of the web, said first stage of subsequent forward transport of the web taking place during said temporary increase in tension of the web.

2. In an apparatus wherein a flexible web is transported forwardly and rearwardly, particularly in a motion picture projector or tape recorder, a combination comprising a rotary web supporting device; drive means operable to transport the web forwardly whereby said device rotates in a first direction to pay out the web and rearwardly whereby said device rotates in a second direction to collect the web, the tension of said web increasing when the supply of web on said device is substantially exhausted and temporarily due to inertia of said device while the direction of rotation thereof is changed from said second to said first direction, said drive means including an electric motor and switch means in circuit with said motor; means for monitoring said changes in tension and for normally arresting said motor by way of said switch means when said tension increases; and control means for preventing stoppage of said motor by way of said switch means while the web is transported rearwardly and during said temporary increase in tension of the web, said control means comprising a mobile control member and said drive means comprising a power train for moving said control member in one direction when said drive means is set in operation to transport the web forwardly and in another direction when said drive means is set in operation to transport the web rearwardly.

3. A combination as defined in claim 2, wherein said power train includes a friction clutch.

4. A combination as defined in claim 3, wherein said control means further comprises means for limiting the extent of movement of said control member in said one and said other direction.

5. A combination as defined in claim 4, wherein said last mentioned means comprises a pair of spaced-apart projections provided on said control member and an arresting member disposed between said projections, said arresting member being located in the path of one of said projections during movement of said control member in said one direction and in the path of the other of said projections during movement of said control member in said other direction.

6. A combination as defined in claim 5, wherein said control member is rotatable in said one and said other direction.

7. In an apparatus wherein a flexible web is transported forwardly and rearwardly, particularly in a motion picture projector or tape recorder, a combination comprising a rotary web supporting device; drive means operable to transport the web forwardly whereby said device rotates in a first direction to pay out the web and rearwardly whereby said device rotates in a second direction to collect the web, the tension of said web increasing when the supply of web on said device is substantially exhausted and temporarily due to inertia of said device while the direction of rotation thereof is changed from said second to said first direction, said drive means including an electric motor and switch means in circuit with said motor; means for monitoring said changes in tension; and for normally arresting said motor by way of said switch means when said tension increases, said switch means comprising a normally closed first switch which is opened by said monitoring means in response to increasing tension of the web and a normally open second switch connected in parallel with said first switch; and control means for preventing stoppage of said motor by way of said switch means while the web is transported rearwardly and during said temporary increase in tension of the web, said control means including a control member arranged to close said second switch when said drive means is set in operation to transport the web rearwardly and to continue to maintain said second switch in closed position for a predetermined interval of time when said drive means is thereupon set in operation to transport the web forwardly, said interval of time coinciding with said temporary increase in tension of the web and the resulting opening of said first switch by said monitoring means.

8. A combination as defined in claim 7, wherein said control member is movable from a first position in which said second switch is open to at least one second position in which said second switch is closed, said drive means comprising a power train arranged to move said control member from said first position as soon as said drive means is set in operation to transport the web rearwardly, and to return said control member to said first position after elapse of said interval when said drive means is thereupon set in operation to transport the web forwardly.

9. A combination as defined in claim 8, wherein said control member is a rotary cam having a lobe which allows said second switch to open only in said first position of said cam and closes said second switch as soon as said cam leaves said first position, said power train being arranged to maintain said cam in said first position during forward transport of the web so that said second switch is open and said first switch can arrest said motor in response to increasing tension of the web while the web is transported forwardly.

10. A combination as defined in claim 7, wherein said drive means further includes an electric circuit having a primary portion including said motor and a secondary portion including said first and second switches.

11. A combination as defined in claim 10, wherein said primary portion of said circuit further comprises a third switch in series with said motor and said secondary portion of said circuit further comprises holding means for maintaining said third switch in closed position as long as at least one of said first and second switches remains closed.

12. A combination as defined in claim 11, wherein said primary portion of said circuit further comprises a master switch connected in parallel with said third switch said holding means comprising an electromagnet connected in said secondary portion of said circuit and being energized when at least one of said first and second switches is closed to thereby maintain said third switch in closed position.

13. A combination as defined in claim 12, wherein said primary portion of said circuit further comprises an energy source in series with said motor and said secondary portion of said circuit further comprises a fifth switch in series with said first and second switches, said circuit further comprising a transformer having a primary winding connected in said primary portion in series with said master switch and said third switch and a secondary winding connected in said secondary portion in series with said first, second and fifth switches, and further comprising selector means actuatable to move said master switch and said fifth switch to a first position in which said master switch is closed and said fifth switch is open whereby said primary portion of said circuit is completed irrespective of the position of said third switch and said drive means is set in operation to transport the web rearwardly, to a second position in which said master switch and said fifth switch are open so that said motor is at a standstill, and from at least one of said first and second positions through an intermediate position and to a fourth position in which said master switch is open and said fifth switch is closed whereby said electromagnet is energized to close said third switch and said drive means is set in operation to transport the web forwardly, said master switch and said fifth switch being closed in said intermediate position so that said transformer energizes said electromagnet.

14. In an apparatus wherein a flexible web is transported forwardly and rearwardly, particularly in a motion picture projector or tape recorder, a combination comprising a rotary web supporting device; drive means operable to transport the web forwardly whereby said device rotates in a first direction to pay out the web and rearwardly whereby said device rotates in a second direction to collect the web, the tension of said web increasing when the supply of web on said device is substantially exhausted and temporarily due to inertia of said device while the direction of rotation thereof is changed from said second to said first direction, said drive means including an electric motor and switch means in circuit with said motor, said switch means comprising a normally closed tension-responsive switch; means for monitoring said changes in tension and for normally arresting said motor by way of said switch means when said tension increases, said monitoring means comprising an actuating member movable from a first position to a second position in response to increasing tension of the web to thereby open said switch; control means for preventing stoppage of said motor by way of said switch means while the web is transported rearwardly and during said temporary increase in tension of the web; and arresting means operable by said control means to block the movement of said actuating member to said second position while the web is transported rearwardly and for a predetermined interval of time when said drive means is thereupon set in operation to transport the web forwardly, said interval coinciding with said temporary increase in tension of the web.

15. A combination as defined in claim 14, wherein said arresting means comprises a lever which is pivotable by said control means from an operative position in which said lever blocks the movement of said actuating member to said second position to an inoperative position in which said actuating member is free to move to said second position in response to increasing tension of the web.

16. A combination as defined in claim 15, further comprising means for biasing said lever to said operative position.

17. A combination as defined in claim 16, wherein said control means comprises a mobile control member and said drive means comprises a power train arranged to move said control member in one direction when said drive means is set in operation to transport the web forwardly whereby said control member pivots said lever from said operative position and to move said control member in another direction when said drive means is set in operation to transport the web rearwardly whereby said control member permits said biasing means to return said lever to said operative position.

18. A combination as defined in claim 17, wherein said power train includes a friction clutch.

19. A combination as defined in claim 18, wherein said control member is rotatable by said friction clutch in said one and said other direction and comprises two spaced apart projections, said lever comprising a portion which extends into the path of one of said projections when said friction clutch rotates said control member in said one direction and into the path of the other of said projections when said friction clutch rotates said control member in said other direction.

20. A combination as defined in claim 19, wherein the distance between said projections is such that said one projection reengages said portion of said lever and returns said lever to said inoperative position after the elapse of said interval following a renewed setting of said drive means in operation to transport the web forwardly.

21. A combination as defined in claim 18, wherein said power train further comprises a worm drive and said friction clutch is interposed between said worm drive and said control member.

* * * * *